Patented Apr. 16, 1940

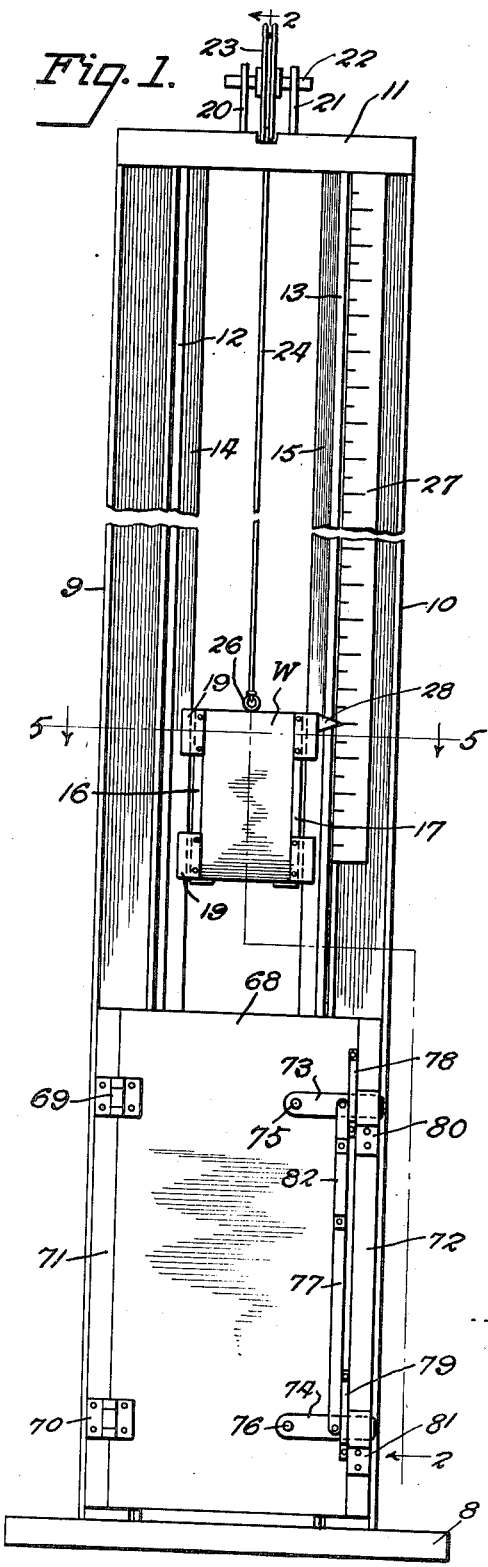

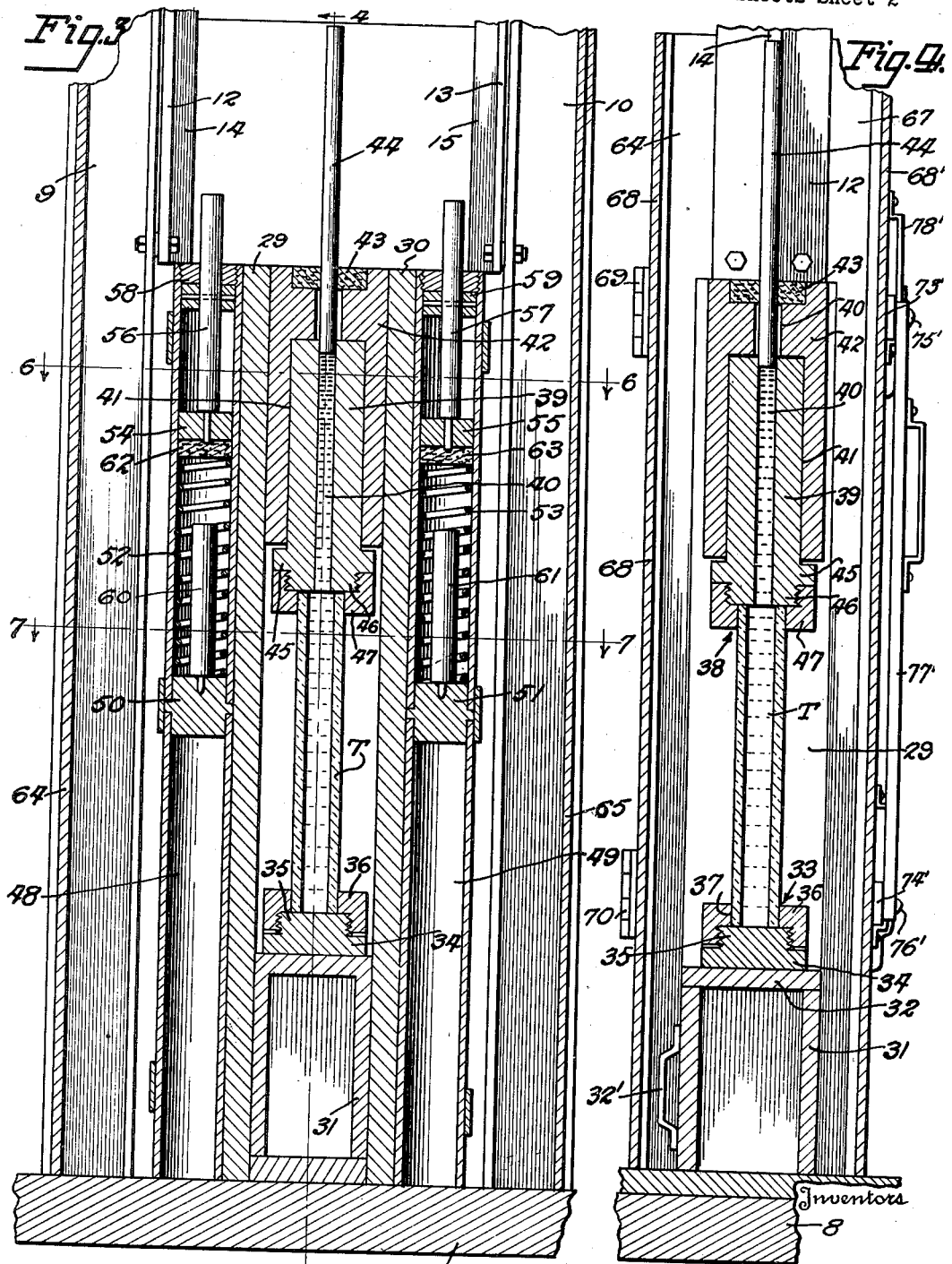

2,197,585

UNITED STATES PATENT OFFICE 2,197,585

APPARATUS FOR TESTING TUBES BY IMPACT

Hjalmar T. Lundquist, Kennett Square, Pa., and Joseph S. Tatnall, Claymont, Del., assignors to National Vulcanized Fibre Company, Wilmington, Del.

Application April 21, 1938, Serial No. 203,400

8 Claims. (Cl. 73—51)

The invention forming the subject matter of this application resides in an improved apparatus for determining the strength of tubing.

The main object of the invention is to provide a very simple compact and inexpensive apparatus for readily determining the relative impact strengths of tubes.

Other objects of the invention will become apparent as the detailed description thereof proceeds:

In the drawings:

Figure 1 is a front elevation of a preferred form of apparatus for testing tubes;

Figure 2 is a vertical section taken on the irregular line 2—2 of Figure 1;

Figure 3 is a vertical section taken on the line 3—3 of Figure 6;

Figure 4 is a vertical section taken on the line 4—4 of Figure 3;

Figure 6:
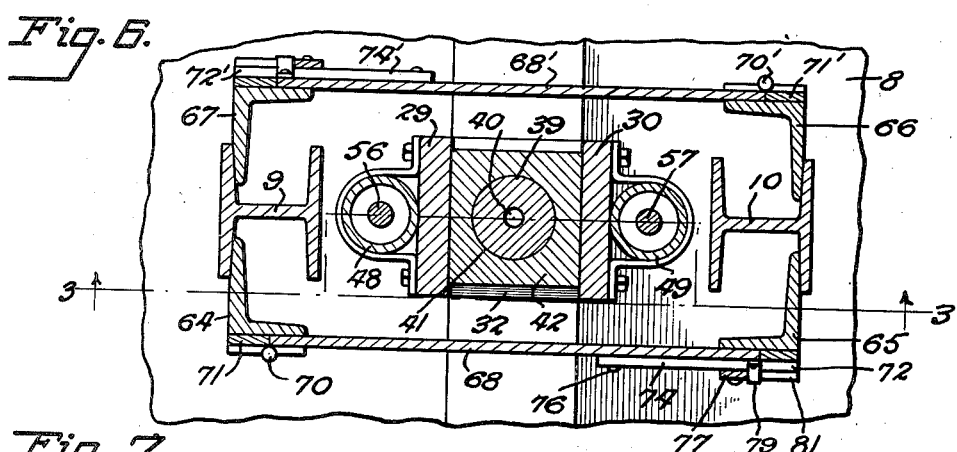
Figure 7:
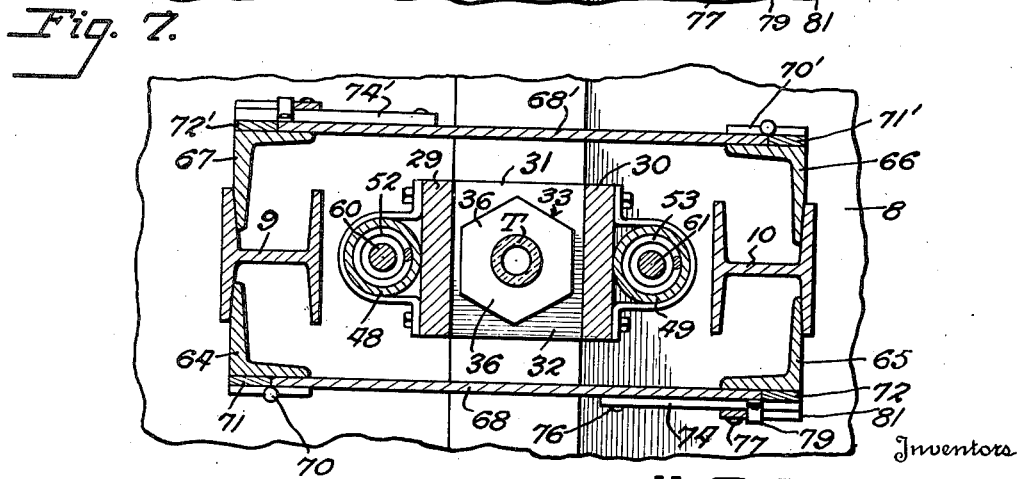

Figures 6 and 7 are horizontal sections taken on the lines 6—6 and 7—7 of Figure 3, respectively.

The procedure involved in the testing of tubes consists in filling the tube under test with oil or some other suitable liquid, and then in applying impact pressure to the liquid by means of a dropping weight striking a plunger, said plunger giving an impact blow to the liquid in the tube; the liquid in turn transmitting the impact to the inside walls of the tube. The impact strength of the tube can be determined by dropping the weight from a predetermined height and by successively increasing the height from which the weight is dropped until rupture of the tube occurs, or by dropping the weight from a height sufficient to break the tube and measuring the impact pressure in the tube by some suitable means, and again, an impact fatigue test can be obtained by successively dropping the weight from a constant height until rupture of the tube occurs.

As shown in the drawings, the preferred form of the apparatus comprises a base plate 8, having standards 9 and 10 spaced apart parallel to each other and suitably secured at their lower ends to the said base plate 8. The upper ends of these standards 9 and 10 are secured to each other in parallel spaced apart relationship by the cross-bar 11. The standards 9 and 10 are of H-column cross-section; and have suitably secured to their opposed flat surfaces the plates 12 and 13 having tongues 14 and 15, respectively, extending toward each other and lying in substantially the same vertical plane.

The tongues 14 and 15 constitute guides for a weight W which is mounted to slide between the standards 9 and 10. The weight W is in the form of a substantially rectangular plate having its opposite edges provided with wear strips 16 and 17, respectively, adapted to take up such wear as results from sliding contact with the opposed edges of the guide tongues 14 and 15. At its corners, the weight W is provided with plates 18 and 19 suitably secured to the plate and spaced apart to form grooves which slidably embrace the opposite sides of the tongues 14 and 15 to restrict the movements of the weight to a vertical plane.

The cross bar 11 has suitably secured thereto a pair of brackets 20 and 21 spaced apart to form bearings for a shaft 22 on which is mounted a grooved pulley 23. As shown in Figure 2, the shaft 22 is offset toward the front of the framework formed by the standards 9 and 10 and crossbar 11, so that the cable 24, extending over this pulley and through an aperture 25 in the crossbar 11, may be connected, without binding on the edges of said aperture, to an eyelet 26 secured to the upper edge of the weight W. A scale 27, preferably calibrated in feet and tenths of feet, is suitably secured to the standard 10 to cooperate with an indicator 28 fixed to the upper end of the weight W.

Between the standards 9 and 10, there is mounted a pair of short standards 29 and 30 fixed at their lower ends to the base plate 8 and extending parallel to each other and to the main standards 9 and 10. An anvil 31 is mounted removably upon the base plate 8 between the short standards 29 and 30 and is provided with a handle 32' to facilitate the removal whenever desired. The top 32 of the anvil 31 forms a support for a fitting designated generally by the reference numeral 33. This fitting comprises a base member 34 provided with an externally screw-threaded cylindrical projection 35 adapted to form a centering support for the lower end of a tube T undergoing test.

The lower end of the tube T is maintained in position on the base member 34 by means of an internally screw-threaded cap 36 engaging the threads on the projection 35 and provided with a central aperture 37 receiving the lower end of the tube T with liquid-tight fit. The upper end of the tube T fits snugly under an upper fitting designated generally by the reference numeral 55

38 and comprising a cylindrical member 39 provided with an axial bore 40 intended to align with the axis of the tube T. The cylindrical member 39 fits snugly within a cylindrical bore 41 formed in a substantially rectangular support 42 which is suitably secured at its opposite sides to the short standards 29 and 30. The upper end of the member 42 is provided with an axial bore slightly larger than the bore 40, and is countersunk to receive a guide bushing 43 also apertured coaxially with the bore 40 to receive a plunger 44 which fits with liquid-tight sliding fit in the said bore 40.

The lower end of the member 39, where it projects below the supporting member 42, is provided with an outwardly directed, annular flange 45 and a cylindrical projection 46 having its axis coincident with the axis of the bore 40. The upper end of the tube T is designed to be maintained with its axis aligned with the axis of the bore 40 by means of the screw-threaded cap 47 centrally apertured to fit with liquid-tight fit over the upper end of the tube.

It is intended in this machine to provide caps having different size apertures to correspond with the outer diameters of the tubes undergoing test. It is also contemplated that different lengths of tubes might be taken as basic units, the impact break-pressures of which may be taken as index numbers to determine the relative strengths of tubes of the same dimensions and composition.

The short standards 29 and 30 have secured to their outer sides the cylinders 48 and 49 provided with stops 50 and 51, respectively, which form the seats for the lower end of the compression coil springs 52 and 53. The upper ends of the coil springs 52 and 53 support pistons 54 and 55, respectively, provided at their upper ends with piston rods 56 and 57 which extend slidably through packing glands 58 and 59 above the upper ends of the short standards 29 and 30 in the path of the weight W and act as shock absorbers. The stops 50 and 51 have rods 60 and 61 projecting upwardly therefrom and within the coil springs 52 and 53 to form stops for the pistons 54 and 55 which may be provided with cushioning elements 62 and 63, respectively.

The scale 27 is intended to be calibrated in feet and tenths of feet, with the zero of the scale coincident with the point of the indicator 28 when the weight W rests upon the upper end of the plunger 44. It is to be understood, of course, that different weights may be used in testing tubes of different dimensions and compositions. By calibrating the scale in feet, the distance to which the weight is raised from zero position by the cable 24, multiplied by the weight, may be expressed as "foot-pounds", or merely in figures which may be used to indicate the comparative strengths of the tubes undergoing test. However, in utilizing this apparatus, all the energy involved in the raising of the weight to any particular distance is expanded instantaneously by dropping the weight through that distance, so that all that energy is dissipated by impact on the upper end of the plunger 44. The force applied by such impact could be expressed in poundals; but for convenience in indicating comparative strength, it might be expressed in figures based on the heights to which the weights are raised before release.

Figure 5:
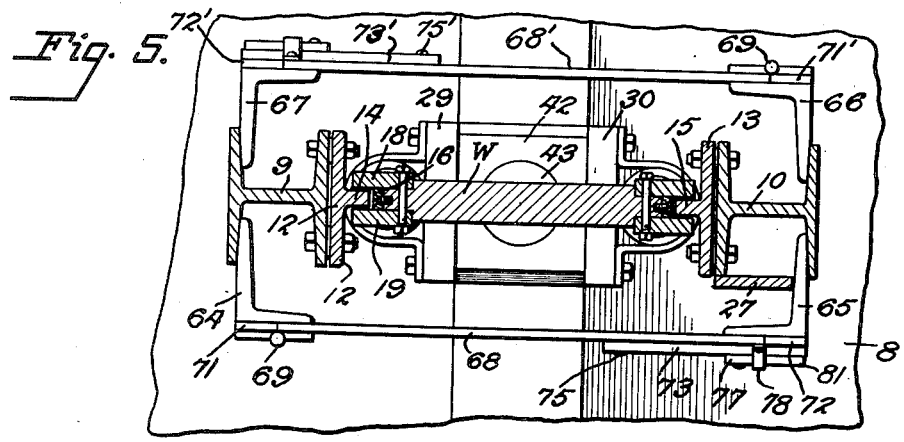
Figure 5 is a horizontal section taken on the line 5—5 of Figure 1.

To prevent injury to the operators of this apparatus, the lower parts thereof are enclosed in a casing provided with doors to give access to such parts. This casing comprises the angle irons 64, 65, 66 and 67, welded or otherwise suitably secured to the outer flanges of the standards 9 and 10, as shown in Figures 5 to 7 of the drawings.

One wall of the casing is formed by a door 68, secured by hinges 69 and 70 to a hinge strip 71 of the same thickness as the door and welded or otherwise secured to the angle iron 64. The striking edge of the door 68, forms a joint, when closed, with the filler strip 72. Latches 73 and 74, rotatable about pivot pins 75 and 76, are pivotally connected to the opposite ends of a link 77 to swing between the guide straps 78 and 79 into and out of locking connection with the keepers 80 and 81 fixed to the strip 72. For convenience in operating this latching mechanism, the link 77 has a handle 82 secured thereto.

Since the opposite wall of the protective casing is structurally identical with that just described, it is not deemed necessary to describe this matter in detail and the corresponding parts thereof are identified by the same reference numerals primed.

While we have illustrated the apparatus as embodied in a particular form, it is to be understood that it is not to be considered as limited to that form or in any other manner except as indicated by the scope of the claims appended hereto.

What we claim is:

1. Apparatus for hydraulically testing tubes comprising: means for supporting a tube filled with liquid in substantially vertical position and with its lower end sealed, a pair of standards extending vertically on opposite sides of said tube-supporting means, a weight slidable between said standards, a plunger, means adapted to seal the upper edge of a supported tube and provided with a bore coaxial with said tube for guiding said plunger to reciprocate relative to said tube and with its axis coincident with the axis of said tube, and means for raising said weight to predetermined heights above the upper end of said plunger, said weight being releasable to fall by gravity against the upper end of said plunger.

2. Apparatus for hydraulically testing tubes comprising: means for supporting a tube filled with liquid in substantially vertical position and with its lower end sealed, a pair of standards extending vertically on opposite sides of said tube-supporting means, a weight slidable between said standards, a plunger, means adapted to seal the upper edge of a supported tube and provided with a bore coaxial with said tube for guiding said plunger to reciprocate relative to said tube and with its axis coincident with the axis of said tube, means for raising said weight to predetermined heights above the upper end of said plunger, said weight being releasable to fall by gravity against the upper end of said plunger, and shock absorbing means on opposite sides of said plunger to limit the downward movements of said weight.

3. Apparatus for hydraulically testing tubes comprising: means for supporting a tube filled with liquid in substantially vertical position and with its lower end sealed, a pair of standards extending vertically on opposite sides of said tube-supporting means, a weight slidable between said standards, a plunger, means adapted to seal the upper edge of a supported tube and provided with a bore coaxial with said tube for guiding said plunger to reciprocate relative to said tube and with its axis coincident with the axis of said tube, means for raising said weight to predetermined heights above the upper end of said plunger, said weight being releasable to fall by gravity against the upper end of said plunger, shock absorbing means on opposite sides of said plunger to limit the downward movements of said weight, and a casing fixed to said standard to enclose the parts of said apparatus supporting the tube undergoing test.

4. Apparatus for hydraulically testing tubes comprising: means for supporting a tube filled with liquid in substantially vertical position and with its lower end sealed, a pair of standards extending vertically on opposite sides of said tube-supporting means, a weight slidable between said standards, a plunger, means adapted to seal the upper edge of a supported tube and provided with a bore coaxial with said tube for guiding said plunger to reciprocate relative to said tube and with its axis coincident with the axis of said tube, means for raising said weight to predetermined heights above the upper end of said plunger, said weight being releasable to fall by gravity against the upper end of said plunger, shock absorbing means on opposite sides of said plunger to limit the downward movements of said weight, and a casing fixed to said standard to enclose the parts of said apparatus supporting the tube undergoing test, said casing including doors on opposite sides of said apparatus, and means for locking said doors releasably in closed position.

5. Apparatus for hydraulically testing tubes comprising: a pair of vertically disposed standards, means to support therebetween a tube for testing, means to seal one end of the tube, an elongated chamber of relatively small diameter directly superposed and hydraulically connected to the tube, a plunger with liquid-tight sliding fit in the chamber, and a hammer slidable between the standards and guided thereby to impact against the tight-fitting plunger.

6. Apparatus for hydraulically testing tubes comprising: a pair of standards, means to support therebetween a tube for testing, means to seal one end of the tube, a chamber of relatively small diameter and immediately connected to the other end of the tube, a plunger with liquid-tight sliding fit in the chamber, liquid filling both chamber and tube, means to impact a force of known magnitude against the tight-fitting plunger the impact means being guided by the standards, and means to alter the force by known amounts.

7. Apparatus for testing a tubular article comprising in combination, a fluid pressure chamber containing a fluid and having a plunger extending in line with the chamber to receive and to transmit impacts into the fluid, the lower portion of the chamber constituting a sealing means for one end of a tube to be tested and disposed so that the tube to be tested shall be aligned with the chamber and sealed immediately thereto whereby successive tubes to be tested may be submitted to impacts on the plunger of the fluid chamber.

8. Apparatus for testing a tubular article comprising in combination, a fluid pressure chamber containing a fluid and having a plunger extending in line with the chamber to receive and to transmit impacts into the fluid, stops arranged at the side of the plunger of the chamber and supported by springs to limit the effective extent of impact upon the plunger, the lower portion of the chamber constituting a sealing means for one end of a tube to be tested and disposed so that the tube to be tested shall be aligned with the chamber and sealed immediately thereto whereby successive tubes to be tested may be submitted to impacts on the plunger of the fluid chamber.

HJALMAR T. LUNDQUIST.
JOSEPH S. TATNALL.